Jan. 11, 1944.                R. G. LE TOURNEAU                2,338,771
                        DOLLY UNIT FOR TWO WHEEL TRACTOR
                    Filed July 25, 1942        2 Sheets-Sheet 1

INVENTOR
R.G. LeTourneau
BY
ATTYS

Jan. 11, 1944. R. G. LE TOURNEAU 2,338,771
DOLLY UNIT FOR TWO WHEEL TRACTOR
Filed July 25, 1942 2 Sheets-Sheet 2

INVENTOR
R.G. LeTourneau
BY
ATTYS

Patented Jan. 11, 1944

2,338,771

UNITED STATES PATENT OFFICE 2,338,771

DOLLY UNIT FOR TWO-WHEEL TRACTORS

Robert G. Le Tourneau, Peoria, Ill., assignor to R. G. Le Tourneau, Inc., Stockton, Calif., a corporation of California Application July 25, 1942, Serial No. 452,258

7 Claims. (Cl. 280—150)

This invention is directed to, and it is an object to provide, a dolly unit of unique construction adapted for attachment in supporting relation to the forward end of a two wheel tractor.

Two wheel tractors, as shown for example in United States Design Patent No. D-130,786, have a forwardly projecting engine mount or frame, which overhangs the ground and is normally supported solely from a transmission housing between the two wheels. This type of tractor is normally connected with a trailing implement by a draft unit which maintains the tractor and implement in vertically inflexible but steerable relation; this relation maintaining the engine mount or frame of the tractor against downward tilting in the forward end thereof. However, for certain purposes, such as transportation of the tractor alone from job to job, repair, servicing, or changing the tractor from one implement to another, it is desirable to drive the tractor detached from any implement. This is accomplished by attaching to the engine mount or frame adjacent its forward end and in supporting relation thereto the dolly unit which is the subject of this invention, and as hereinafter described in detail.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
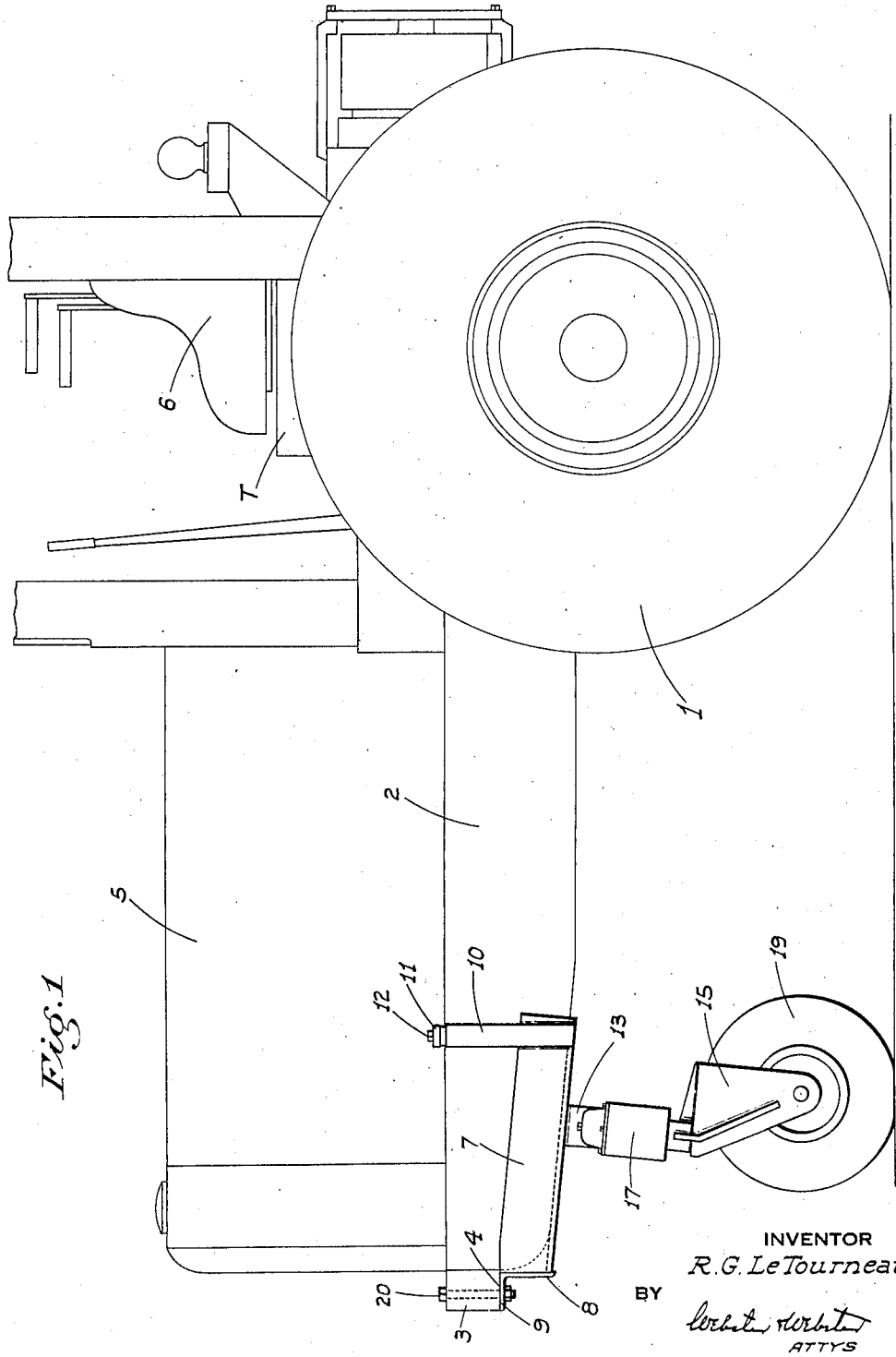
Figure 1 is a side outline of a two wheel tractor as detached from an implement and supported at the front end by the dolly unit.
Figure 2:
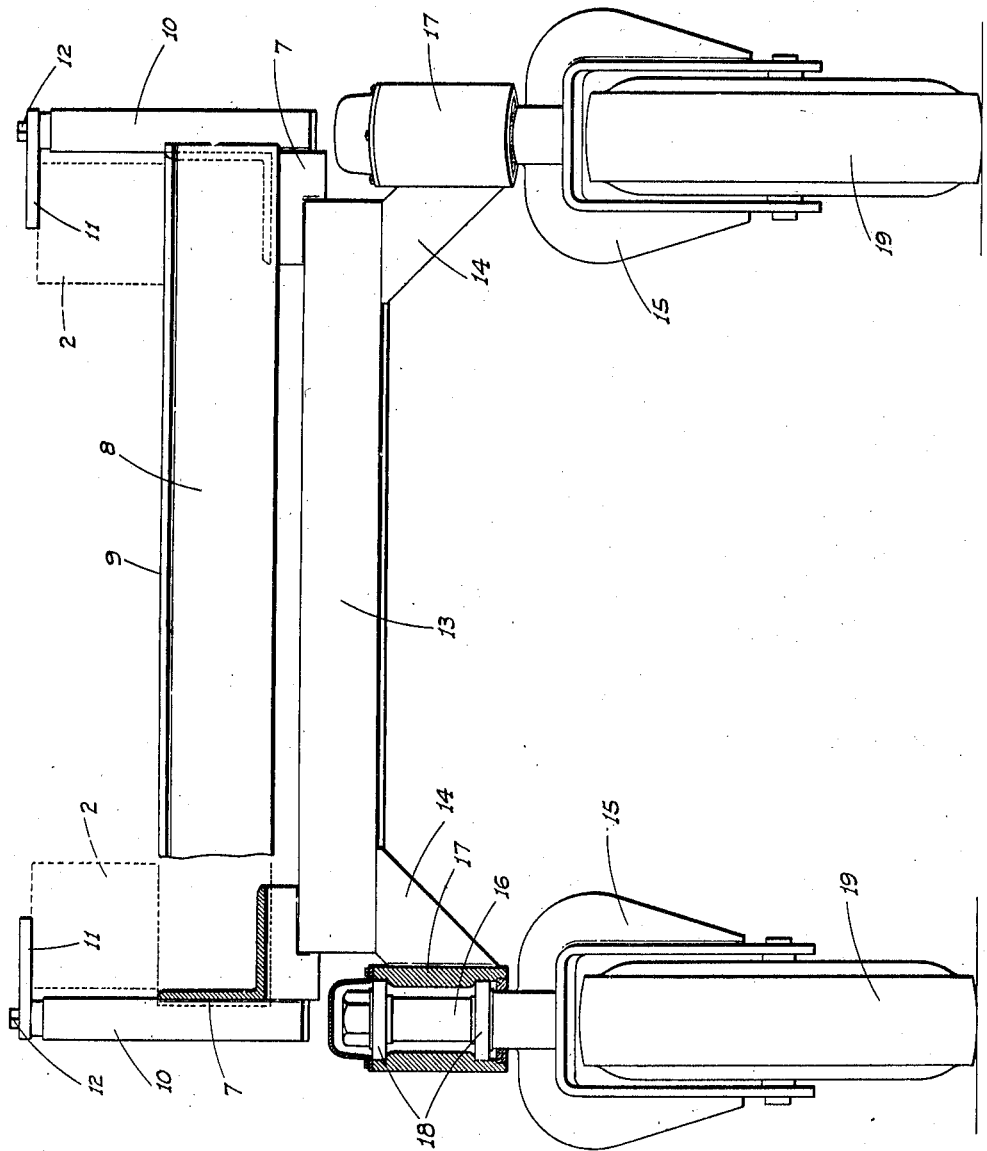
Figure 2 is an enlarged front end view, partly in section, of the dolly unit.

Referring now more particularly to the characters of reference on the drawings, the two wheel tractor to which the dolly unit is adapted to be attached comprises generally, as shown in the above identified design patent, a pair of transversely spaced wheels 1, a transmission unit therebetween, a portion of which is indicated at T, a pair of substantially horizontal forwardly projecting frame members or engine mounts 2 which overhang the ground ahead of the wheels and are unsupported except at their rear end by the transmission housing. The frame members 2 are connected at their forward end by a bumper bar 3, whose lower edge 4 is disposed some distance above the lower edge of the front ends of frame members 2. The frame members 2 are connected by bumper bar 3 and support the tractor engine in housing 5. The tractor also includes an operator's seat 6 mounted atop the transmission case rearwardly of the engine and between the wheels.

The dolly unit to which the instant invention is directed comprises a cradle assembly which includes a pair of parallel longitudinally extending inwardly and upwardly facing angle members 7 of substantial length; these angle members being connected at their forward end by an inverted transverse angle member 8; the upper or top flange 9 of angle member 8 projecting forwardly in a substantially horizontal plane.

Adjacent their rear ends and on the outside, the angle members 7 each have a vertical post 10 secured thereto; said post extending upward to a termination some distance above said angle members. At their upper ends, the posts are fitted with horizontal and laterally projecting fingers 11 each secured to the corresponding post by a bolt 12 threaded vertically into the upper end of said post.

Intermediate their ends, the angle members 7 are rigidly connected at the bottom by a cross beam 13, and short diverging legs 14 project downwardly from the end portions of beam 13. Each of the legs 14 is connected with a caster wheel unit which includes a downwardly opening yoke 15 having a vertical spindle 16 projecting upwardly therefrom into a vertical sleeve 17 fixed in connection with the corresponding leg 14. The spindle 16 is journaled in sleeve 17 by suitable bearing means indicated at 18. A ground engaging wheel 19 is turnably mounted in each yoke 15.

In use, the frame members 2 of the tractor seat at their forward end portions on the angle members 7 of the cradle assembly; the flange 9 of the transverse angle member 8 abutting against the bottom of bumper bar 3 and being detachably secured to said bar by bolts 20. The posts 10 upstand alongside and close to the frame members 2, and the fingers 11 overhang and are clamped against the upper edge of said frame members 2 by means of the bolts 12.

When so secured in connection with the forward end of the engine mount of the tractor, the cradle assembly of the dolly unit is rigid therewith, and the wheels 19 rest upon the ground in supporting relation to the cradle assembly and the forward end of the two wheel tractor.

When the dolly unit is so mounted, it is possible to drive the two wheel tractor without an implement being attached thereto; steering of the tractor being accomplished through the selective wheel drive which the tractor includes; the caster wheel units responding to such steering movement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with a two wheel tractor which includes a forwardly projecting ground overhanging engine mount initially supported solely from its rear end; a dolly unit including a pair of transversely spaced wheels, and means detachably securing said dolly unit in connection with said engine mount adjacent its forward end and in supporting relation thereto; said engine mount including a transverse horizontal bumper bar at its forward end, and said means including a forwardly projecting horizontal flange on the dolly unit engaging beneath said bar, and bolts securing the bar and flange together.

2. A tractor and dolly unit combination as in claim 1 in which the dolly unit includes transversely spaced, longitudinally extending, inwardly facing angle members on the lower flanges of which the engine mount seats at opposite sides of the latter; said means including clamping elements mounted in connection with said angle members adjacent their rear end, said elements overhanging and frictionally engaging the top of the engine mount.

3. A dolly unit comprising a pair of transversely spaced, longitudinally extending and inwardly facing angle members, an inverted angle member rigidly connected between said pair of angle members at their forward end, the top flange of said inverted angle member projecting forwardly, a cross beam disposed below and rigidly connected between said pair of angle members, a pair of caster wheel units mounted on said beam in supporting relation thereto, and means on the unit arranged for detachable connection with a structure seated on said pair of angle members and engaging said flange.

4. A dolly unit as in claim 3 in which said means includes a rigid post mounted on the outside of and upstanding from each of said pair of angle members adjacent the rear end thereof, and a clamping element mounted in connection with and adapted to project laterally inward from the upper end of each post to overhang and frictionally engage an adjacent portion of said structure.

5. In combination with a two wheel tractor which includes a forwardly projecting ground overhanging engine mount initially supported solely from its rear end; a dolly unit including a pair of transversely spaced wheels, and means detachably securing said dolly unit in connection with said engine mount adjacent its forward end and in supporting relation thereto; a wheel supported dolly unit, and means detachably securing said dolly unit in connection with said engine mount adjacent its forward end in supporting relation thereto; said engine mount including a transverse horizontal bumper bar at its forward end, and said means including a forwardly projecting horizontal flange on the dolly unit engaging beneath said bar, and bolts securing the bar and flange together.

6. A dolly unit adapted for detachable connection with and to support a forwardly projecting ground overhanging engine mount of a two wheel tractor, said mount including transversely spaced frame members exposed from below at their forward end portion and a cross bar connecting the same at said end; the dolly unit comprising a wheel-supported cradle assembly in which the engine mount is adapted to be cradled, said assembly including a pair of transversely spaced, longitudinally extending and inwardly facing angle members in which corresponding ones of the frame members are adapted to seat, and means adapted to rigidly but releasably secure the engine mount in said assembly.

7. A dolly unit adapted for detachable connection with and to support a forwardly projecting ground overhanging engine mount of a two wheel tractor, said mount including transversely spaced frame members exposed from below at their forward end portion and a cross bar connecting the same at said end; the dolly unit comprising a wheel-supported cradle assembly in which the engine mount is adapted to be cradled, said assembly including a pair of transversely spaced, longitudinally extending and inwardly facing angle members in which corresponding ones of the frame members are adapted to seat, a cross member connected between the forward ends of said angle members and adapted to engage the cross bar of the engine mount when the latter is cradled in said assembly, and means adapted to releasably secure said cross member and cross bar together.

ROBERT G. LE TOURNEAU.